United States Patent Office 3,705,124
Patented Dec. 5, 1972

3,705,124
WATER-BASED ENAMEL FORMULATIONS FROM ACRYLIC HYDROSOLS
Richard N. Selby and Donald M. Williams, Wilmington, Del., assignors to E. I. du Pont de Nemours and Company, Wilmington, Del.
No Drawing. Continuation-in-part of application Ser. No. 735,587, June 10, 1968, which is a continuation-in-part of abandoned application Ser. No. 467,751, June 28, 1965. This application Jan. 22, 1971, Ser. No. 108,992
Int. Cl. C09d 3/80, 5/02
U.S. Cl. 260—29.6 TA                11 Claims

ABSTRACT OF THE DISCLOSURE

A water-based enamel formulation is disclosed containing pigment, surfactant, a particular acid acrylic interpolymer binder and a particular thickener. The enamels show improvement with respect to ease of flow, leveling ability, lappability, gloss level, gloss uniformity, color retention, hiding power, drying time and consistency stability on storage as compared to ordinary water-based paints.

CROSS-REFERENCE TO RELATED APPLICATIONS

This application is a continuation-in-part of application Ser. No. 735,587, filed June 10, 1968, which in turn is a continuation-in-part of application Ser. No. 467,751, filed June 28, 1965, now abandoned.

BACKGROUND OF THE INVENTION

(1) Field of the invention

This invention relates to novel water-based enamel formulations and their preparation.

(2) Description of the prior art

Hitherto substantially all of the commercial gloss-type enamels having an L-value greater than about 50.0, as measured via ASTM-D-1536-58-T, have been formulated with alkyd resins and volatile organic solvents. Despite the ease of cleaning brush and roller applicators with soap and water, and the reduced flammability hazard involved when working with water-based latices, which advantages have already been realized with the present commercial water-based flat-type formulations, previous attempts to formulate water-based white, pastel, or light-colored gloss or semi-gloss enamels have resulted in products deficient either in ease of flow, leveling ability, lappability, gloss level, gloss uniformity, color retention, hiding power, drying time, consistency stability on storage, or some combination of these or other deficiencies. Further, in attempting to formulate such enamels, difficulties have been experienced due to inability to reliably duplicate formulations of particular initial characteristics as necessary for economy, and in formulating concentrated formulations which could reliably and economically be rinsed from formulating vessels with water.

SUMMARY OF THE INVENTION

According to the present invention there have been found improved water-based enamel formulations, film-forming at 25° C., having a pH of 7.5 to 8.6, a consistency of 65 to 125 Krebs Units and a pigment volume concentration of 18 to 32 percent (of the volume of dried paint film), comprising per 100 gallons, 400 to 575 pounds of water, 200 to 400 pounds of dispersed pigment, 5 to 30 pounds of surfactant (solids basis), 150 to 250 pounds of acrylic hydrosol binder (solids basis) hereinafter described, and 0.2 to 15 pounds (solid basis) of synthetic partially esterified, lower-alkyl vinyl ether maleic anhydride copolymer thickener, hereinafter described. The formulations may and for most purposes preferably do include suitable binder softening agents (i.e., coalescing aids and/or plasticizers) the selection of which is important for maximum desirable properties as well as other additives such as anti-foaming agents, biocides, and the like.

DETAILED DESCRIPTION OF THE INVENTION

The acrylic hydrosol binders useful in the practice of the present invention are dispersed colloidal particles of acidic acrylic interpolymers, having an inherent viscosity in the range of 0.15 to 0.9 as determined at 25° C. on a 100 ml. solution of 0.5 gram of dry interpolymer in chloroform, via the procedure described on pages 80–81 of Billmeyer "Textbook of Polymer Science," Interscience Publishers, New York, 1962, a second order transition temperature of 25° C. to 125° C., and preferably at least 40° C. (as determined by the American Society for Testing Materials Procedure ASTM D-1043–51, ASTM Plastics Standards, page 305, 1958), and comprising, per 100 parts by weight of combined monomer, 1 to 8 parts of component unsaturated acid of the group consisting of acrylic, methacrylic, maleic and itaconic, and 92 to 99 parts complementally of component non-acidic ethylenically unsaturated monomer of 2 to 16 carbons, including 59 to 99 parts, of which at least 20 are methyl methacrylate, of acrylic from the group consisting of alkyl acrylate and alkyl methacrylate, together with nitrogenous base in amount sufficient to neutralize at least 30 percent of the free carboxyl groups of said interpolymer, at least 95 percent of the total number of said interpolymer particles having average diameters in the range of 0.01 to 0.1 micron. Preferably, due to their small size, the particle size of the interpolymer particles is determined from an ultracentrifuge schlieren pattern of the hydrosol. The manner in which particle sizes can be so determined is described in a 1964 article by H. W. McCormick found in volume 19 of the Journal of Colloid Science at pages 173–184 titled "Determination of Latex Particle Size Distribution by Analytical Ultracentrifugation." Interpolymer binders of this class can be prepared by methods disclosed in the copending application of Kermit W. Winkelblech U.S. Ser. No. 72,124, filed Sept 14, 1970.

In general, the polymeric binders useful in the invention are prepared by interpolymerizing the component monomers, preferably in an agitated aqueous medium in the presence of a free radical initiator and a dispersing agent, to obtain a mixture containing 20 to 40 weight percent of particles of interpolymer having the specified second order transition temperature and molecular weight and an average diameter somewhat above 0.1 micron. Where the second order transition temperature of the interpolymer is above 25° C., an amount of polymer softening agent, generally 10 to 100 percent based on the weight of the interpolymer, sufficient to reduce the second order transition temperature of the interpolymer in the aqueous medium to about 5 to 25° C. but insufficient to cause phase inversion, is added to the aqueous mixture. Thereafter, nitrogenous base is added, usually in amount sufficient to neutralize 30 to 150 percent, and preferably 45 to 85 percent of the free carboxyl groups of the interpolymer, and the mixture is subjected to shear agitation at 40° C. to 100° C. until a colloidal dispersion in which at least 95 percent of the total number of interpolymer particles have an average diameter in the range of 0.01 to 0.1 micron, and preferably 0.01 to 0.05 micron, is obtained. Since the interpolymer particles have been substantially reduced in size during the shear agitation, they are said to be comminuted.

It is essential that the interpolymer binder contain at least about 1 percent and less than about 8 percent, by weight of the total combined monomers, of the specified acidic monomer in order to obtain suitably dispersible particles which are adequately water-insensitive, as indicated by insolubility in concentrated ammonium hydroxide. Interpolymers containing 3 to 6 percent of the acidic monomer are preferred for optimum balance of properties.

It is also essential that the interpolymer binder comprise, in addition to the combined acidic monomer, at least about 59 weight percent of the specified combined non-acidic acrylic monomers in order that a satisfactorily glossy and permanent dry paint film be obtained, and preferably, for maximum gloss and permanence, the interpolymer will be substantially entirely acrylic. However, where maximum gloss and/or permanence is not essential, formulations of somewhat lower cost can be obtained by including up to about 40 weight percent of other component non-acidic ethylenically unsaturated monomer of 2 to 16 carbon atoms. Of these the beta-substituted monofunctional ethylenes, which have a single site reactive for addition polymerization, the balance of the molecule being essentially chemically inert under the conditions of polymerizing, dispersing, formulating and aging, are preferred. Examples of such monomers include vinyl and vinylidene chlorides and fluorides, alkyl vinyl ethers, styrene, alkanoic acid esters of vinyl alcohol, and the like. Vinyl acetate is an especially preferred comonomer. However other monomers such as butadiene, ethylene glycol dimethacrylate, glycerol trimethacrylate, and the like may also be used.

In the preferred formulations the hardness of the final paint film will depend to a considerable extent upon the relative proportions of combined methyl methacrylate in the acrylic hydrosol, maximum hardness being obtained where the interpolymer consists essentially of component methyl methacrylate and the prescribed amount of component unsaturated acid. However, for most purposes greater film flexibility is desired, and it is usually desirable to include from 20 to 60 parts, and particularly 25 to 35 parts per 100 parts of combined monomer by weight, of other alkyl acrylate or alkyl methacrylate. Ethyl acrylate is a preferred acrylic comonomer for maximum quality and economy, and preferred copolymers have a transition temperature of at least 40° C.

Comonomers other than acrylics may also be used in obtaining flexible films at even lower cost, and where so used the interpolymer will preferably consist essentially, besides unsaturated acid, of such comonomer, preferably vinyl acetate, and methyl methacrylate. The presence of comonomer serves to provide an internal plasticization of the polymer.

Internal plasticization has been found to provide equivalent flexibility with somewhat higher film strength, but at considerably higher cost than external plasticization, which, however, has been found to provide excellent to adequate film strength at external plasticizer (non-volatile softener) loadings up to about 30 weight percent of hydrosol solids. For maximum economy and performance, amounts of comonomer will be such as to provide desired flexibility when the interpolymer is formulated with 15 to 25 weight percent of non-volatile softener.

It is essential that the molecular weight of the binder interpolymer correspond to an inherent viscosity of at least about 0.15 measured as above, since lower molecular weight polymers provide insufficient binder strength. Desirably for maximum strength, the molecular weight will be as high as possible, but it has been found that the difficulty of preparing hydrosols of the requisite small particle size increases with increasing molecular weight. Molecular weights corresponding to an inherent viscosity as above described in the range of 0.25 to 0.50 are therefore generally used.

It is essential to the gloss, brush leveling characteristics and advantageous consistency characteristics of the formulations of the invention that the particles be of colloidal size, with not more than about 5 percent of their total number being larger in average diameter than about 0.05 micron. Due to colloidal size of the interpolymer particles the acrylic hydrosols markedly differ in appearance from ordinary polymer dispersions. Thus, whereas ordinary dispersions are opaque at customary commercial solids levels, e.g., 30–60% the present colloidal dispersions of comminuted particles are non-opaque; being either clear, cloudy, or only slightly tinted, e.g., bluish or yellowish. As used herein, the term non-opaque describes dispersions which, when in 2 oz. sample bottles at solids levels of 30–60%, are substantially transparent to a strong light source such as a 60 watt bulb. Conversely, opaque dispersions in the same size bottle and at corresponding solids levels are not transparent to such a light source. While with the present non-opaque dispersions the shape of the light source, e.g., bulb, can be generally delineated through the dispersion, such is not so with respect to opaque dispersions.

It is also essential that there be sufficient nitrogenous base present to neutralize at least 30 percent and preferably 45 to 85 percent of the acidic groups of the interpolymer, at least until the paint is applied to a substrate. At lower neutralization the particles tend to grow in size. The aqueous dispersion also tends to thicken undesirably if nitrogenous base is present in amounts great enough to neutralize more than about 85 percent of the acid groups and the concentration of binder particles is greater than about 40 percent by weight of the mixture. Excess nitrogenous base may be neutralized, or removed by evaporation. Although any nitrogenous base can be used, ammonia is greatly preferred, since it is easily volatile when the paint film is dried and helps provide lower water-sensitivity in the final film.

The softening agent employed in dispersing the harder interpolymers having second order transition temperatures above 25° C. may be any normally liquid organic compound which is non-boiling under the dispersion conditions, and is effective to at least swell the interpolymer particles. Organic compounds containing one or more oxygen atoms, e.g., alcohols, ethers, esters, glycol ethers, polyols and the like are preferred, but compounds containing nitrogen atoms, e.g., amides, imides, alkyl pyridines, amines, imines and the like, may also be used. Nitrogenous organic bases may also be used to serve the dual function of softening agent and neutralizer of free carboxyl groups. Volatile softening agents, such as isopropanol, diethylene glycol monoethyl ether, ethylene glycol, and the like, which evaporate during hydrosol preparation or when the paint formulation dries, are preferably used when a final film of maximum hardness is desired, while non-volatile softening agents such as acetyl tributyl citrate, butyl benzyl phthalate, and the like, which are retained when the paint formulation dries, are used where greater toughness is desired in the final paint film. Butyl benzyl phthalate is preferred for maximum gloss and consistency stability. The softening agents also function as coalescing aids in the formation of paint film, and as adjuvants effective to lower the freezing point of the formulations.

In general higher gloss is favored by using higher amounts of relatively slowly volatile binder softeners, but at the expense of increased drying time and higher cost. The preferred formulations of the invention, containing a total of 50 to 150 pounds of binder softening agent per 100 gallons, have been found to provide good to excellent gloss, and drying adequate to permit application of a second coat within 4 hours or less of an original application. Preferably, for maximum economy, the formulations contain less than 60 pounds of volatile softening agent per 100 gallons.

In preparing the formulations of the present invention, although less concentrated hydrosols can be used, it is preferred to employ hydrosols having the maximum interpolymer content consistent with maintaining the required small particle size, generally 40 to 50 percent, inasmuch as the amount of softening agent needed to maintain consistency stability decreases as the interpolymer concentration increases. To avoid unnecessarily shearing the interpolymer particles, it is preferred to prepare the pigment dispersion separately, and thereafter combine it with the hydrosol.

The thickeners useful in the practice of the invention are partially esterified acidic copolymers of 1 weight part of component lower-alkyl vinyl ether/maleic acid copolymer, having a specific viscosity in the range of 0.1 to 3.5 as determined at 25° C. on a 100 ml. solution of 1 gram of dry polymer in methyl ethyl ketone via the procedure described by Billmeyer, supra, with 0.2 to 1 weight part of component polyether alcohol consisting essentially of component $C_{10}$ to $C_{20}$ aliphatic or aromatic alcohol and 6 to 35 moles, per mole of said aliphatic or aromatic alcohol, of component ethylene oxide, together with base in amount sufficient to neutralize a water solution of the esterified copolymer to a pH of at least 7.0, preferably in the range of 7 to 9.5. It is essential for adequate wet adhesion that the amount of this synthetic thickener, on a solids basis, be less than about 15 pounds per 100 gallons, and amounts in the range of 0.2 to 10 pounds per 100 gallons are preferred, as dictated by the extent of thickening necessary to attain desired enamel consistency. Thickeners of 1 weight part methyl vinyl ether/maleic anhydride copolymer of relatively low molecular weight corresponding to a specific viscosity of 0.1 to 0.5, measured as above, esterified with about 0.5 weight part of polyether alcohol, consisting essentially of component $C_{10}$ to $C_{16}$ alcohol with about 16 moles, per mole of $C_{10}$ to $C_{16}$ alcohol, of component ethylene oxide, in water solution, neutralized to pH 8.5–9.5, are preferred.

In general, higher gloss is favored by use of the relatively low molecular weight component copolymer. Higher molecular weight component copolymer, particularly when neutralized with ammonium hydroxide, provides increased thickening and wet adhesion at some sacrifice in gloss.

It is essential to adequate viscosity and storage stability that the pH of the final formulation be in the range of 7.5 to 8.6, and preferably, especially with high volatiles formulations, 7.9 to 8.1. The overall pH will be governed largely by the pH of the hydrosol employed, and to a lesser extent by the pH of the thickener solution. In general, pH of the preferred concentrated hydrosols will be in the range of 7 to 8 to facilitate handling, and usually about 7.5.

In general, to qualify as gloss-type enamels, formulations must provide final dry paint films which have a specular gloss, measured at a 60° angle, of at least 20 as determined by the procedure of ASTM D–523–62T. While individual classifications vary, generally values of 20 to 40 are regarded as semi-gloss, values of 40 to 70 are variously classified as either gloss or semi-gloss, and values above 70 are regarded as gloss. However, the gloss value of a particular film may be greatly affected by the manner in which it is applied. For purposes of the present invention, except as otherwise specified, the gloss values referred to are determined on films prepared by draw-down with a Bird application blade on a Morest Chart, via the procedure of ASTM D–823–53, Method D, using a blade clearance of about 6 mils. This provides a wet film of about 3 mils thickness which dries to about 1 mil thickness. It will be appreciated that presence of pigment in general tends to increase the difficulty of achieving high gloss in the final paint film. Nevertheless, it is essential that the final paint film contain at least about 18 volume percent pigment in order to provide sufficient hiding power, and it has been found impractical to achieve satisfactory gloss at pigment volume concentrations (PVC values) above about 32 percent.

Even within the 18 to 32 percent PVC range however, it is necessary to employ very finely ground pigments to achieve satisfactory gloss values. The term "pigment" used herein is intended to include both prime pigment and pigment extenders such as clay, talc, calcium carbonate, barium sulfate, etc. In general, any homogeneously dispersible pigment may be used. However, non-homogeneously dispersible pigments, such as most of the synthetics silicas, which tend to float to the surface and cause flatting, may also be used in small amounts. Titanium dioxide is by far the preferred pigment because of its high hiding power and low cost, and the formulations preferably contain at least 200 lbs. of titanium dioxide per 100 gallons. Where colors other than white are desired, preferred practice is to employ a titanium dioxide base, together with relatively small amounts of color adjuvants, such as iron oxide yellows and reds, phthalocyanine blues and greens, molybdate orange, chromium oxide greens, zinc chromate yellow, and lamp blacks or carbon blacks. Pigment extenders may be employed to lower cost, but at the expense of somewhat reduced hiding power and lower gloss values. While the total quantity of pigment necessary to provide adequate PVC values will vary to some extent with the particular pigment used, in general the formulations may contain 200 to 400 pounds per 100 gallons, including, in the preferred titanium dioxide formulations, 0 to 100 pounds of pigment extender and/or color adjuvant.

Satisfactory fineness of pigment may be achieved by grinding in aqueous media on high speed stone mills, sand mills, high speed notched-disc impeller blenders such as the Hockmeyer or Cowles dissolvers and the like. Grinding is continued until the fineness of grind is in the range of 0.0 to 0.5 mil, and preferably 0.0 as determined by the procedure of ASTM D–1210–64. In preferred pigment preparations, the pigment and water, together with surfactant, and, optionally, antifoam, thickener, permanent plasticizer, and any other desired additives, are all ground together before the polymeric binder is added. Optimum grinding is achieved by grinding mixtures in which the weight ratio of pigment to other components is about 1 to 1, i.e., a relatively thick mixture.

In order to achieve and maintain a satisfactorily fine and uniform pigment dispersion it is essential that a surfactant be employed. In general, any of the commercially available trademarked surfactants can be used, including both water-miscible and water-immiscible types, and anionic, cationic and non-ionic types, e.g., tertiary amine condensation products of primary fatty amines and ethylene oxide, such as the Armour "Ethomeens;" dioctyl esters of sulfosuccinic acid, such as American Cyanamid "Aerosol"-OT; sodium salts of polycarboxylic acids such as Rohm and Haas "Tamol" 731; potassium tripolyphosphate; ammonium salts of styrene/maleic anhydride copolymers such as Sinclair "SMA 1440–H"; nonylphenoxypoly(ethyleneoxy)ethanols, such as Antara Division of General Aniline and Film "Igepal" Cl–630; poly(oxyethylene) sorbitan trioleates, such as Atlas "Tween" 85; octylphenoxypoly(ethyleneoxy)ethanols, such as Rohm and Haas "Triton" X–35 and X–305, and the like.

In general, however, anionic type surfactants have been found to provide superior pigment dispersion, and non-ionic types to provide superior gloss and consistency stability, and a mixture of the two types is preferred for optimum balance of properties. Of the non-ionic surfactants, those having a hydrophilic/lipophilic balance (HLB value) in the range of 7 to 18 and especially 12 to 14, as determined by the procedure described at pages 839–852 of the Official Digest of Paint Technology and Engineering, August 1964, are preferred, for optimum color acceptance. In general, the total amount of surfactant (solids basis) including any used in preparing the hydrosol, will range from 5 to 30 pounds per 100 gallons of final formulations. With lower amounts, inadequate gloss is achieved. Within this range final gloss and consistency storage stability improve with increasing amounts of surfactant. However, at surfactant levels above about 30 pounds per gallon, the final paint films manifest unacceptable water-spotting sensitivity, i.e., if droplets of water are sprayed on the film and allowed to stand for a time, spots or streaks will appear and remain when the droplets are wiped off. The preferred total surfactant is in the range of 12 to 22 pounds, solids basis, per 100 gallons of formulation, considering the active components as solids.

While not essential, it is greatly preferable that the formulation include a suitable antifoam agent. Antifoam agents need not be employed if the pigment grind is prepared in a non-foaming procedure, such as by the use of a 3-roll mill. However, in the absence of such agent, application of the formulation, particularly by roller, tends to cause the development of bubbles which interfere with gloss uniformity. While in general any of the well known antifoam agents which are effective in aqueous media can be used, the non-siliceous types have been found preferable. Typically effective antifoam agents are water-insoluble liquids which form thin non-elastic films on the surface of the formulations, e.g., 2-ethyl-hexanol, diisobutyl carbinol, higher polymerized glycols and their ethers, higher fatty acid amides, fatty acid esters, alkyl lactates, higher ethers, 2-(ditertiary amylphenoxy)ethanol, organic phosphates, sorbitan esters, and the like. Useful commercially available tradenamed products include Colloids, Incorporated "Colloid 581–B," a mixture of synthetic metallic soaps, synthetic esters, and synthetic glycol ester nonionic surfactants in a mineral oil base; and Balab "Bubble Breaker 748", a mixture of selected hydrocarbons, fatty amines, magnesium soaps, and polyglycol non-ionic surfactants. Relatively small amounts, in the range of 0.001 to 4, and typically 1 to 4 pounds per 100 gallons are preferred.

The formulations of the present invention are based substantially entirely on synthetic ingredients which have good resistance to biodegradation, although small amounts of natural or synthetic water-soluble polyols or ethers, e.g., ethylene glycol, propylene glycol, glycerol, hexylene glycol, etc., may be included to improve gloss. However, for maximum resistance to biodegradation, it is desirable to include biocides, such as phenyl mercury acetate, phenyl mercury succinate, sodium orthophenyl phenol, sodium pentachlorophenol or the like. These compounds are effective at loadings in the range of about 0.1 to 1 pound per 100 gallons of formulation.

In formulating the enamels of the present invention, the manner and order of addition of the several ingredients is important for best results, although a wide variety of addition orders can be successfully employed. Preferably, the pigment is thoroughly wetted with a rather concentrated solution of the pigment dispersing surfactant before being contacted with hydrosol or thickener, and any subsequent dilution with hydrosol, thickener solution or water is carried out gradually so as to minimize localized isolation or separation of the pigment particles from pigment dispersing surfactant. Nonionic surfactants are preferably either added and thoroughly distributed well prior to addition of the hydrosol, or added after the hydrosol and pigment dispersion have been thoroughly mixed, so as to minimize the tendency of the concentrated nonionics to gel the concentrated hydrosols. Gradual dilution from higher solids to lower solids is particularly important after the pigment dispersion of requisite fineness has been prepared.

EXAMPLES OF THE INVENTION

The invention is more particularly described and explained by means of the following illustrative and comparative examples, in which reference is made to ingredients described in Table I, and to their formulation into illustrative white enamels, as set forth in Table II. The particle size of the interpolymer in the hydrosol in Table I was determined using a Beckman Model E ultracentrifuge and a schlieren pattern taken after 447 seconds. Prior to actually obtaining the schlieren pattern from which the particle size distribution was determined, three initial tests were run in order to establish, respectively, the density of the hydrosol interpolymer, the appropriate concentration at which the actual particle size determination should be made, and the appropriate centrifuge speed. Density was determined by diluting a small sample of the hydrosol with water to 10% solids, sedimenting the particles using a Beckman Model L preparative centrifuge operated at 35,000 r.p.m., and, thereafter, determining the interpolymer density by a density gradient technique using a salt column in accordance with the method described in ASTM D–1505–63T. Density was found to be 1.1773 grams/cc. The appropriate concentration at which to make the actual particle size determination is the minimum concentration at which a schlieren pattern is easily detectable. This was established by trial and error, using the Model E ultracentrifuge, to be 2.0%. Similarly, the appropriate centrifuge speed was determined by several trials, the appropriate speed being that at which the schlieren peak moved toward the bottom of the cell over an acceptable time limit. A speed of 24,000 r.p.m. was selected. For both the concentration and speed determinations a double sectored cell was employed. Also, with respect to these determinations, it was found to be desirable to add to the samples a dilute surfactant solution of Rohm and Haas Co. "Triton" X–100, t-octyl-p-phenyl polyoxy-ethylene alcohol containing 9–10 ethylene oxide groups, in order to aid emulsion stability.

Table II lists from top to bottom in the order of their addition, the parts by weight of the several ingredients used. With each enamel, formulation procedure involved an initial "pigment dispersion" step, in which those ingredient parts appearing above the solid line in Table II were first successively and gradually added with slow stirring to a formulating vessel. The resulting mixture of these ingredients was then dispersed either for about 20 minutes, using a dispersion mixer of the notched-blade disc type rotating at about 3500 r.p.m., or, in the case of Enamel 1150 by passage through a sand mill, or in the case of Enamels 1180 and 1185, a once-through pass through a Morehouse stone mill, in each instance to provide a pigment dispersion having a fineness of 0.0. Then, in a subsequent "reduction" step, those ingredient parts appearing below the solid line in Table II were successively and gradually added with slow stirring to the pigment dispersion, and the whole mixture further stirred with a paddle stirrer for about 20 minutes to provide a smooth uniform final mixture.

Table III sets forth the overall composition of each enamel (expressed in pounds per 100 gallons, corresponding when multiplied by 0.12 to grams per liter), along with selected enamel properties and performance characteristics. Throughout the specification, including the examples, tables and claims, except as otherwise specified, consistencies are given in Krebs Units as determined at about 23° C. using a Stormer viscosimeter, and other reported special test values are as determined by tests described in preceding portions of this specification. The pH values of the illustrative and comparative enamels are all in the range of 7.5 to 8.6.

References in the examples to lappability or lap reflow properties, brush leveling properties, and color acceptance properties are the results of subjective comparisons. For purposes of these comparisons, a sample of the enamel was brushed onto a lacquered paper chart with a 1 inch nylon-bristled brush to cover a 5 inch by 5 inch square. The coated area was then allowed to dry for 8 minutes, and a second 5 inch by 5 inch area, overlapping the first by about 1 inch at one edge, was applied in the same way, and then the whole was allowed to dry fully. Leveling was then adjudged poor, fair, good or excellent by reference to premade standards, according to the uniformity of flatness and smoothness of the unlapped areas. Lappability was adjudged in a similar way, according to the uniformity of appearance between the lapped and unlapped areas, poor reflow being indicated by a "feathered" appearance at the intersection of the first and second coats, or by the appearance of brush marks in the lapped area. Color acceptance was adjudged in a similar way by uniformity of color over the coated area.

TABLE I

Ingredient description (1) Water
(2) Antifoam agent
   (A) Colloids Inc. "Colloid" 581–B, organic liquid antifoam agent, 100 percent active.
(3) Biocide
   (A) Nuodex "Super-Ad-It," di(phenyl mercury) dodecenyl succinate.
(4) Volatile softener
   (A) Union Carbide "Carbitol" solvent, a mixture of, per 100 parts by weight, 75 parts diethylene glycol monoethyl ether, and 25 parts ethylene glycol.
   (B) ethylene glycol.
   (C) propylene glycol.
   (D) glycerol.
(5) Non-volatile softener
   (A) Monsanto "Santicized" 160, butyl benzyl phthalate.
(6) Surfactant
   (A) Rohm and Haas "Tamol" 731, sodium salt of diisobutylene/maleic anhydride copolymer anionic surfactant, 25% solids by weight.
   (B) potassium tripolyphosphate, anionic surfactant, 100 percent solids by weight.
   (C) G.A.F. Antara Division "Igepal" CO-630, nonylphenoxypoly (ethyleneoxy)ethanol, nonionic surfactant, HLB value 12.8, 100 percent solids by weight.
   (D) American Cyanamid "Aerosol" OT, dioctyl ester of sulfosuccinic acid, nonionic surfactant, 75 percent solids by weight.
   (E) Sinclair SMA 1440–H, ammonium salt of styrene/maleic anhydride copolymer, anionic surfactant, 37 percent solids by weight.
(7) Pigment
   (A) Du Pont "Ti-Pure" R-900 titanium dioxide.
   (B) Minerals and Chemicals ASP-200 clay.
   (C) Minerals and Chemicals ASF-400 clay.
(8) Hydrosol
   (A) acrylic hydrosol having a viscosity of 100 to 200 centipoises and containing, per 100 parts by weight, about 30 parts (a) acrylic interpolymer having an inherent viscosity in the range of 0.27 to 0.33, a second order transition temperature of about 68° C., and comprising, per 100 parts of combined monomer, by weight, 66 parts methyl methacrylate, 29 parts ethyl acrylate, and 5 parts methacrylic acid, the interpolymer being in the form of dispersed colloidal particles predominantly of average diameter in the range of 0.03 to 0.13 micron, and having greater than 95 percent of the total number of particles of average diameter in the range of 0.01 to 0.1 micron, in about 70 parts (b), a mixture of 59 parts water, 10.8 parts "Carbitol" solvent, and 0.2 part sodium lauryl sulfate, the hydrosol being neutralized to pH about 8.5, corresponding to about 90 percent neutralization of free carboxyl groups, with ammonium hydroxide.
   (B) an acrylic hydrosol having a viscosity of about 500 to 1500 centipoises, (or, in enamels 782 and 786, 330 cps.) and containing, per 100 parts by weight, about 45 parts (a) acrylic interpolymer of (8)(A)(a) supra, in about 55 parts (b), a mixture of 50 parts water, 4.5 parts "Carbitol" solvent (or, in enamels 805 through 902, hexylene glycol), (or, in enamel 752, 5.8 parts "Carbitol" solvent and 48.7 parts water), 0.27 part sodium lauryl sulfate, and 0.23 part isopropanol, the hydrosol being neutralized to pH about 7.5, corresponding to about 45 percent neutralization of free carboxyl groups with ammonium hydroxide.
(9) Thickener
   (A) G.A.F. "Thickener L," a solution prepared from, per 100 parts by weight, about 85 parts (a) water; 10 parts (b) poly(methyl vinyl ether/maleic anhydride) copolymer, having a specific viscosity in the range of about 0.1–0.5 ("Gantrez" AN–119 polyelectrolyte), reacted with 5 parts (c) polyoxyethylated fatty alcohol, the fatty alcohol being of 10 to 16 carbon atoms, there being about 16 ethylene oxide units per fatty alcohol unit ("Emulphor" ON–870 emulsifier) to provide a solution of partial ester having a pH of about 3, the solution being neutralized to pH 8.5–9.5 with potassium hydroxide.
   (B) G.A.F. "Thickener LN," a solution corresponding to the description of (9)(A) supra except in being neutralized with ammonium hydroxide instead of potassium hydroxide, and having slightly higher molecular weight component copolymer.
   (C) A 2 weight percent (2.5 in enamel 1180) solids aqueous solution prepared by diluting Rohm and Haas "Acrysol" ASE-60 (a 28 weight percent solids aqueous emulsion of a terpolymer of methyl methacrylate, ethyl acrylate, and acrylic acid, the acrylic acid comprising about 35 weight percent of the terpolymer), and neutralizing to pH 8.0 with ammonium hydroxide.

TABLE II

| Ingredients | | 683 | 717-L | 752 | 782 | 786 | 895 | 896 | 897 | 901 | 902 | 978 | 990 | 1125 | 1127 | 1150 | 1180 | 1185 |
|---|---|---|---|---|---|---|---|---|---|---|---|---|---|---|---|---|---|---|
| (1) | Water | 92 | 102 | 102 | 154 | 154 | 70 | 70 | 70 | 144 | 144 | 172 | 172 | | | 70 | 30 | 30 |
| (6)(E) | "SMA" 1440-H | | | | | | | | | | | | | 9 | 9 | | | |
| (2)(A) | Colloid 581-B | | | | 3 | 3 | 2 | 2 | 2 | | | 3 | 3 | 2 | 2 | | | |
| (4)(A) | "Carbitol" | 8 | 8 | 9 | | | | | | 13 | 13 | | | | | | | 8 |
| (6)(A) | "Tamol" 731 | | | | | | | | | | | 6 | 6 | | | 8 | 8 | 8 |
| (6)(D) | "Aerosol" OT | 3 | | | | | | | | | | | | | | | | |
| (2)(A) | Colloid 581-B | 2 | 2 | 2 | | | | | | 3 | 3 | | | | | 2 | 2 | 2 |
| (6)(A) | "Tamol" 731 | 4 | 4 | 4 | 6 | 6 | | | | 6 | 6 | | | | | | | |
| (6)(E) | "SMA" 1440-H | | | | | | 6 | 6 | 12 | | | | | | | | | |
| (4)(C) | Propylene glycol | | | | | | | | | | | | | 28 | 28 | 30 | 30 | 30 |
| (6)(B) | KTPP | 2 | 2 | 2 | 2 | 2 | | | | 3 | 3 | 2 | 2 | | | | | |
| (4)(B) | Ethylene glycol | | 20 | 20 | 20 | 20 | 20 | 20 | 20 | 28 | 28 | 20 | 20 | | | | | |
| (6)(C) | "Igepal" CO-630 | 3 | 4 | 8 | 10 | 10 | 10 | 10 | | 11 | 11 | 10 | 10 | | | | | |
| (5)(A) | "Santicizer" 160 | | | | | | 32 | 32 | 32 | | | 38 | 30 | | | 32 | 32 | 32 |
| (7)(A) | "TiPure" R-900 | | | | 268 | 268 | 231 | 231 | 231 | 275 | 231 | 210 | 210 | 210 | 210 | 230 | 230 | 230 |
| (1) | Water | | | | | | | | | | | | | 48 | 48 | | | |
| (3)(A) | "Super Ad-It" | | | | | | | | | | | | | 1 | 1 | | | |
| (6)(C) | "Igepal" CO-630 | | | | | | | | | | | | | 9 | 9 | 9 | 9 | 9 |
| (4)(B) | Ethylene glycol | 20 | | | | | | | | | | | | | | | | |
| (7)(B) | ASP-200 clay | | | | | | 44 | 44 | 44 | 50 | 44 | 50 | 50 | | | | | |
| (5)(A) | "Santicizer" 160 | | | | | | 56 | | | 61 | 61 | | | | | 32 | 32 | |
| (7)(A) | "TiPure R-900 | 265 | 266 | 265 | | | | | | | | | | | | | | |
| (7)(C) | ASP-400 clay | | | | | | 66 | | | | | | | | | | | |
| (1) | Water | | | | | | | | | | | | | | | | 20 | 20 |

TABLE II—Continued

| Ingredients | | 683 | 717-L | 752 | 782 | 786 | 895 | 896 | 897 | 901 | 902 | 978 | 990 | 1125 | 1127 | 1150 | 1180 | 1185 |
|---|---|---|---|---|---|---|---|---|---|---|---|---|---|---|---|---|---|---|
| (8)(B) | 45% hydrosol | | | | | | | | | | | | | 339 | 339 | | | |
| (3)(A) | "Super Ad-It" | | | | | | | | | | | | | | | 1 | 1 | 1 |
| (1) | Water | | | | | | | | | | | | | | | | | |
| (5)(A) | "Santicizer" 160 | 34 | 43 | 43 | 56 | | | | | | | | | | | | | |
| (9)(A) | "Thickener L" | 5 | 2 | 2 | 8 | 8 | 32 | 32 | 32 | 3 | 3 | 58 | 58 | 93 | | | | |
| (8)(B) | 45% hydrosol | | | | | 551 | | 382 | | 525 | 525 | 374 | | | | 339 | 339 | 339 |
| (3)(A) | "Super Ad-It" | | | | | | | | | | | | | | | | | |
| (9)(A) | "Thickener L" | | | | | 12 | 16 | | 16 | 20 | 20 | | | | | 30 | 30 | |
| (9)(B) | "Thickener LN" | | | | | | | | | | | | | | 54 | | | 46 |
| (1) | Water | | | | | | | | | | | 100 | | 259 | 259 | | 30 | 170 |
| (8)(B) | 45% hydrosol | | | | 372 | 551 | | 382 | | 382 | | | | | | | | |
| (8)(A) | 30% hydrosol | | 569 | 570 | | | | | | | | | | | | | | |
| (5)(A) | "Santicizer" 160 | | | | | | | | | | | | 4 | | | | | |
| (8)(B) | 45% hydrosol | | | | | | | | | | | 374 | | | | | | |
| (9)(C) | "Acrysol" ASE-60 | | | | | | | | | | | | | | | 166 | 133 | |
| (9)(A) | "Thickener L" | | | 2 | 12 | | | | | | | | | | | | | |
| (6)(C) | "Igepal" CO-630 | 3 | 4 | | | | | | | | | | | | | | | |
| (1) | Water | | | | | | 26 | | 26 | | | | | 100 | | 84 | | |
| (4)(D) | Glycerol | | | | | | | | | | | 20 | 20 | | | | | |
| (9)(C) | "Acrysol" ASE-60 | | | | | | | | | | | | | | | | | |
| (4)(C) | Propylene glycol | | | | | | | | | | | | | | | | | 20 |

TABLE III

| Composition, lbs./100 gal. | 683 | 717-L | 752 | 782 | 786 | 895 | 896 | 897 | 901 | 902 | 978 | 990 | 1125 | 1127 | 1150 | 1180 | 1185 |
|---|---|---|---|---|---|---|---|---|---|---|---|---|---|---|---|---|---|
| (1) Water | 472.3 | 471.7 | 423.8 | 445.2 | 457.8 | 444.6 | 419.6 | 452.5 | 429.1 | 435.9 | 520.1 | 522.8 | 565.6 | 556.9 | 541.6 | 478.0 | 508.8 |
| (2) Antifoam | 2.2 | 2.1 | 2.8 | 2.9 | 3.0 | 2.6 | 2.8 | 2.6 | 2.9 | 3.0 | 3.0 | 3.0 | 2.0 | 2.1 | 2.1 | 2.3 | 2.3 |
| (3) Biocide | | | | | | | | | | | | | 1.0 | 1.0 | 1.0 | 1.2 | 1.2 |
| (4) Volatile softener | 97.0 | 94.7 | 53.5 | 32.3 | 33.3 | 38.6 | 41.2 | 38.9 | 52.6 | 53.4 | 49.2 | 49.5 | 36.1 | 37.8 | 47.2 | 82.5 | 52.8 |
| (5) Non-volatile softener | 36.8 | 45.7 | 60.1 | 53.8 | 55.7 | 42.1 | 45.0 | 42.4 | 59.6 | 60.5 | 38.1 | 34.1 | 31.8 | 33.2 | 33.4 | 37.6 | 37.4 |
| (6) Surfactant solids | 13.4 | 12.7 | 16.5 | 16.2 | 16.7 | 19.0 | 20.3 | 8.6 | 18.2 | 18.5 | 15.7 | 15.8 | 12.9 | 13.6 | 12.5 | 12.9 | 13.9 |
| (7) Pigment | 287.2 | 282.6 | 370.5 | 320.9 | 266.6 | 361.8 | 368.8 | 363.9 | 317.4 | 272.7 | 260.5 | 260.7 | 208.7 | 218.2 | 240.3 | 269.9 | 268.7 |
| (8) Hydrosol solids | 185.0 | 181.6 | 234.1 | 238.2 | 229.1 | 245.0 | 230.6 | 233.8 | 237.4 | 170.9 | 168.8 | 151.6 | 158.5 | 159.4 | 179.1 | 178.2 | |
| (9) Thickener solids | 0.8 | 0.8 | 0.4 | 2.9 | 3.0 | 9.5 | 6.8 | 9.6 | 3.3 | 3.4 | 8.7 | 8.7 | 13.9 | 8.4 | 8.2 | 9.2 | 8.0 |
| Properties: | | | | | | | | | | | | | | | | | |
| Specular gloss | 41 | 53 | 56 | 33 | 60 | 57 | 35 | 34 | 52 | 72 | 66 | 63 | 84 | 84 | 66 | 72 | 86 |
| Consistency: | | | | | | | | | | | | | | | | | |
| Original | 121 | 93 | 67 | 85 | 76 | 107 | 105 | 91 | 78 | 73 | 95 | 99 | 82 | 82 | 78 | 105 | 101 |
| 60 days | 101 | | 73 | | | 99 | 98 | 94 | 77 | | 70 | | 121 | | | | |
| 120 days | | 123 | | 98 | 79 | 100 | 100 | 75 | 75 | 70 | | 96 | | | | | |
| 210 days | 78 | | 72 | 90 | 85 | | | | | | | | | | | | |
| Pigment/binder, weight ratio | 1.21 | 1.17 | 1.17 | 1.03 | 0.82 | 1.21 | 1.22 | 1.25 | 1.01 | 0.85 | 1.02 | 1.05 | 0.99 | 1.01 | 1.12 | 1.12 | 1.12 |
| Non-volatiles, weight percent | 47.9 | 48.0 | 59.1 | 56.9 | 54.6 | 57.7 | 60.3 | 57.0 | 56.7 | 54.7 | 48.3 | 47.9 | 41.1 | 42.1 | 43.5 | 47.7 | 47.4 |
| PVC, percent | 26.4 | 25.7 | 25.1 | 24.9 | 19.0 | 27.6 | 27.7 | 28.4 | 24.0 | 21.1 | 24.9 | 25.4 | 22.4 | 22.7 | 24.4 | 24.4 | 24.6 |
| Coverage, mil-ft.²/gal | 512 | 519 | 695 | 677 | 659 | 675 | 718 | 660 | 679 | 665 | 548 | 547 | 439 | 452 | 464 | 521 | 515 |

Example I (Enamel 683)

This example illustrates an enamel of adequate pigment content, viscosity, gloss and consistency stability on aging characteristic of the enamels of the present invention. Also characteristically, the enamel manifests a unique, nearly non-Newtonian shear-viscosity relationship, increasing in consistency by a factor of only about 2 on decrease of shear rate from 100 to 1 reciprocal seconds, in contrast to factors of 10 or more for typical flat acrylic latex formulations. Correspondingly, the enamel showed excellent application properties and gloss uniformity on application by conventional brushing and rolling techniques. The gloss and stability on aging were broadly comparable to those of enamel 682, formulated identically but with 50 parts of a modified natural resin thickener, "Cascoloid" ST-40 casein, which showed a specular gloss of 64 and an initial viscosity of 94 increasing in two months to 97 and decreasing in 7 months to 80. The synthetically thickened enamel was found preferable to the casein thickened enamel because of lowered susceptibility to biodegradation, increased batch-to-batch uniformity of thickening action, and reduced change of consistency with temperature.

In contrast, attempts to formulate satisfactory enamels of the above hydrosol with a large number of other thickeners were unsuccessful. A number of these, e.g., "Cascoloid" ST-56 and ST-52, and "Ulasein" 15 caseins; Fales F-20 and F-100 proprietary casein derivatives; "Elvanol" 50-42 polyvinyl alcohol; "Alcogum" AW-10 and PA-15 A, and "Acrysol" ASE-60, ASE-75, HV-1, and A-5 polyacrylates; "Carbitol" acetate solvent; "Santomez" 31 ethylene/maleic anhydride copolymer; polyvinyl pyrrolidone; gum arabic; and gum tragacanth were found either to gel the hydrosol or thicken it to a paste. Others, e.g., "Gantrez" AN vinyl ether/maleic anhydride copolymer; "Veegum" HV and F complex magnesium aluminum silicates; "Baymal" colloidal alumina; "Carbopol" 941 carboxy vinyl polymer; Keltex P-143-63 alginate; "Superloid" starch; "Kelzan" polysaccharide; "Klucel" HA hydroxypropyl cellulose; "Rohagit" S polyacrylate; "Carbitol" solvent; "Santomez" 61 ethylene/maleic anhydride copolymer; "Pentoxol" 4-methoxy - 4 - methyl - pentanol - 2 solvent; "Cellosize" WP-4400 hydroxyethyl cellulose; "Polyox" WRSN-3000 ethylene oxide polymer; and "Acrysol" ASE-108 polymeric acrylic salt, were found to provide poor (delayed) thickening or insufficient thickening. Still others, e.g., "Keltex" S alginate; "Cyanomer" P-250 polyacrylamide; "Elvanol" 76-50M polyvinyl alcohol; "Cellosize" QP-09 hydroxyethyl cellulose, and "Acrysol" ASE 95 polymeric acrylic salt were found to result in rapid thinning on aging, high haze, or low gloss. Various combinations of a number of these other materials were also tried without success. Thus the thickeners of the present invention appear to have an extremely rare if not unique action in combination with the hydrosols employed in the practice of the invention.

Example II (Enamel 717-L)

This enamel, similar to Enamel 683 but formulated with an increased amount of non-volatile softener and somewhat smaller amounts of thickener, illustrates attainment of a heightened gloss of 53 in a synthetically thickened formulation. A comparison enamel, 717, identically formulated except that it was thickened to approximately the same consistency with 58 parts of "Cascoloid" ST-40 casein, had a gloss of 54 and an initial consistency of 78 which rose in two months to 88 and decreased in another four months to 78.

Example III (Enamel 752)

This enamel, differing from 717–L in using 45 percent rather than 30 percent hydrosol, at the same pigment/binder ratio, shows attainment of excellent gloss and consistency stability in a synthetically thickened enamel, and reflects also the advantageous decrease in amount of volatile softener to below 60 pounds per 100 gallons possible with the synthetically thickened, more concentrated hydrosol. In comparison, enamel 745, formulated identically, except that 569 parts of 30 percent hydrosol and 58 parts of "Cascoloid" ST–40 casein thickener were substituted for the 45 percent hydrosol and synthetic thickener, showed a gloss of 64 and an initial consistency of 93, decreasing in 5 months to 88. The calculated cost per square foot of coating one mil thick with enamel 752 was only 85 percent of the comparable cost with enamel 745.

Example IV (Enamels 782 and 786)

These enamels, similar to enamel 752 except that even lower amounts of volatile softener were employed, show good consistency stabilities at costs per mil square foot of coverage about 10 percent lower, at some sacrifice in gloss, using extender pigment (enamel 782), and about 5 percent lower, at no sacrifice in gloss, without extender pigment (enamel 786). However, at the low PVC percent of enamel 786, the hiding power of the enamel was marginal.

Example V (Enamels 895, 896 and 897)

Enamel 895 illustrates the attainment of high gloss, excellent consistency stability and high hiding power per unit of film thickness (high PVC), in a synthetically thickened, desirably consistent formulation, differing from enamel 786 in that extended pigment and a higher pigment to binder ratio were employed, with greater amounts of synthetic thickener and a different pigment-dispersing surfactant. Enamel 896, formulated identically with enamel 895 except for somewhat smaller amounts of water and thickener, shows that similar results can be achieved in an enamel of even higher solids content (so as to be useful in single-coat applications), while affording a gloss adequate but markedly lower than that of 895. Enamel 897, also formulated identically with 895 except with anionic surfactant alone instead of the mixture of anionic and nonionic surfactant used in 895, shows by comparison the importance of including nonionic surfactant where peak gloss and maximum consistency stability, particularly with later water dilution, are desired. Other tests indicated that the mixture of anionic and nonionic surfactants provided better retained pigment deflocculation than the nonionic alone, that stable or rising consistency stabilities resulted from use of the more hydrophobic nonionics (low HLB values), at some sacrifice of tinting colorant acceptance, while the more hydrophilic nonionics favored falling consistency stabilities. Still other tests indicated that reducing total surfactant below about 5 pounds (solids basis) per 100 gallons resulted in inadequate substrate wetting causing fisheyes, while increasing total surfactant above about 30 pounds per 100 gallons caused water-spotting on the dried enamel film. Enamels 895 and 896 provide both good color acceptance and excellent consistency stability, while enamel 897 shows excellent color acceptance.

Example VI (Enamels 901 and 902)

These enamels resemble 782 and 786 but employ higher amounts of volatile softener to provide increased gloss. However in 902, the relatively low pigment content although only slightly higher than 786, provided good hiding power. Contrast ratio was 0.973 for 901, and 0.969 for 902, which also had excellent gloss. Contrast ratios were determined via ASTM D–1738–60T.

Example VII (Enamels 978 and 990)

Enamel 978 provides excellent gloss, consistency stability and good brush-leveling with relatively small amounts of softeners, by using glycerol as a volatile softener. The minimum temperature at which enamal 978 coalesced to a film was 32° F. as determined by a tentative ASTM test, and 36° F. for enamel 990, which contained slightly less non-volatile softener. Other enamels (991 and 992) constituted identically except using 30 and 48 parts of non-volatile softener, respectively, showed minimum film-forming temperatures of 51° F. and 22° F., and glosses of 61 and 75. At non-volatile softener levels above about 30 percent of hydrosol solids however, surface haze which interfered with gloss uniformity developed in the dried paint film, and at levels below about 15 percent, room temperature coalescence was poor.

A comparative enamel, 977, formulated identically with 978 except that hydrosol solids were replaced with dispersed colloidal particles of a commercial sytrene-acrylic latex, in which less than 95 percent of the total number of particles were smaller than 0.05 micron, provided a gloss of 55, and, even though the consistency was markedly lower at 60–64, poor leveling properties. In contrast, enamel 990 showed good leveling at its 121 consistency. In another comparison enamel 1004, in which there were substituted colloidal emulsion particles of the precursor of the hydrosol of enamel 978, and having less than 95 percent of the total number of particles smaller than 0.05 micron, also provided poor leveling properties, and in contrast to enamels 978 and 990, showed a falling consistency pattern on aging.

The difference in consistency behavior of enamels 978 and 990 appeared to be at least partly occasioned by mold action. In separate studies, samples of an enamel 1020 formulated identically with enamel 978 were found to develop a slight mold skin on two months aging, whether or not contaminated with added mold. Identically contaminated and uncontaminated samples of enamel 1020, inhibited with one pound of Nuodex "Super-Ad-It" di-(phenyl mercury) dodecenyl succinate biocide per 100 gallons of enamel, showed no mold skin on aging.

Example VIII (Enamels 1125, 1127 and 1150)

Enamel 1125, which had a pH of 8.0, illustrates a formulation of lower cost per gallon, differing from preceding illustrative enamels in containing a higher percentage of volatiles together with increased thickener to achieve desired viscosity level and in using propylene glycol to improve lappability. Lappability was approximately equivalent to the good results obtained with enamel 978 despite the higher volatiles in 1125. However, the wet adhesion of 1125 was marginal, as judged by fingernail pressure required to remove a coating of the paint film, applied over an enamel undercoat, after drying for seven days and then leaving under a film of water for 15 minutes, as compared with enamel 978. Stability on aging was also marginal. Enamel 1127, also of pH 8.0, in which a lesser amount of the more efficient ammoniated thickener was employed, showed improved (fair to good) wet adhesion, but again stability on aging was marginal. A comparison enamel 1129, formulated identically with 1125 except that only 23 parts of the thickener were used, together with four parts concentrated ammonium hydroxide to increase thickening, provided an enamel of excellent wet adhesion, having a pH 8.4, 78 gloss, and original consistency of 114 which however decreased in 11 days to below 60, so as to be unacceptably thin.

Enamel 1150, a pH 8.0 enamel differing from 1125 in employing a smaller amount of "Thickener L" together with "Acrysol" ASE–60 as a cothickener, provided good wet adhesion and improved stability on aging, but only fair to good brush-leveling and lap-reflow characteristics.

Example IX (Enamels 1180 and 1185)

These enamels differed from those of the preceding example in increased solids (total non-volatiles above 45%) and improved consistency stability. Enamel 1180, pH 8.0, utilizing "Thickener L" plus "Acrysol" ASE–60 cothickener, showed wet adhesion somewhat better than that of 1127, and better leveling and lap reflow properties. On three day aging at 120° F., viscosity decreased to 101, and on three day aging at 140° F., viscosity decreased to 97. Enamel 1185, pH 8.1, also showed better wet adhesion, and superior leveling and lap reflow properties. Consistency decreased to 95 after three days at 120° F., and to 99 after three days at 140° F.

This invention has been described in considerable detail. Obviously, many variations in these details can be made without departing from the spirit and scope of this invention. Accordingly, it is to be understood that this invention is not to be limited except as defined by the appended claims.

We claim:

1. A water-based enamel formulation which is film forming at 25° C., has a pH of 7.5 to 8.6, a consistency of 65 to 125 Krebs Units, and a pigment volume concentration of 18 to 32 percent, and which comprises per 100 gallons,
   (A) 400 to 575 pounds of water,
   (B) 200 to 400 pounds of uniformly dispersed titanium dioxide pigment having a fineness of 0.0 to 0.5 mil as measured by ASTM D–1210–64,
   (C) 5 to 30 pounds of surfactant selected from the group consisting of tertiary amine condensation products of primary fatty amines and ethylene oxide, dioctyl esters of sulfosuccinic acid, sodium salts of polycarboxylic acids, potassium tripolyphosphate, ammonium salts of styrene-maleic anhydride copolymers, nonylphenoxypoly(ethyleneoxy)ethanols, poly(oxyethylene) sorbitan trioleates and octylphenoxypoly(ethyleneoxy) ethanols,
   (D) 150 to 250 pounds of comminuted dispersed colloidal acrylic hydrosol particles of acidic acrylic interpolymer having an inherent viscosity in the range of 0.15 to 0.9, a second order transition temperature in the range of 25° to 125° C., and comprising, per 100 parts by weight of combined monomer, 1 to 8 parts of unsaturated acid selected from the group consisting of acrylic, methacrylic, maleic and itaconic acids, 59 to 99 parts, of which at least 20 parts are methyl methacrylate, of acrylic monomer of 2 to 16 carbon atoms selected from the group consisting of alkyl acrylates and alkyl methacrylates, and 0 to 40 parts of non-acidic ethylenically unsaturated monomer of 2 to 16 carbon atoms selected from the group consisting of vinyl chloride, vinylidene chloride, vinyl fluoride, vinylidene fluoride, alkyl vinyl ethers, styrene, alkanoic acid esters of vinyl alcohol, butadiene, ethylene glycol dimethacrylate and glycerol trimethacrylate, said particles being prepared by
      (1) adding to an aqueous medium containing particles of said interpolymer having an average diameter above 0.1 micron, ammonium hydroxide in an amount sufficient to neutralize 30 to 150 percent of the free carboxyl groups in said interpolymer, and
      (2) subjecting the mixture to shear agitation at 40° to 100° C. until a reduction in size of the interpolymer particles takes place such that at least 95 percent of the total number of said interpolymer particles have average diameters in the range of 0.01 to 0.1 micron, and
   (E) 0.2 to 15 pounds of partially esterified acidic copolymer thickener derived from 1 weight part of lower alkyl vinyl ether/maleic anhydride copolymer having a specific viscosity in the range of 0.1 to 3.5, esterified with 0.2 to 1 weight part of polyether alcohol derived from ethylene oxide and $C_{10}$ to $C_{20}$ alcohol in the ratio of 6 to 35 moles of ethylene oxide per mole of said alcohol, and base in an amount sufficient to neutralize a water solution of said esterified copolymer to a pH of at least 7.0.

2. A formulation according to claim 1 wherein said acrylic interpolymer has a second order transition temperature of at least 40° C. and an inherent viscosity of at least 0.25, and comprises, per 100 parts of combined monomer, 3 to 6 parts of unsaturated acid, 20 to 60 parts of ethyl acrylate, and 34 to 77 parts of methyl methacrylate, and said formulation comprises 50 to 150 pounds of interpolymer softening agent selected from the group consisting of isopropanol, diethylene glycol monoethyl ether, ethylene glycol, acetyl tributyl citrate, butyl benzyl phthalate, propylene glycol and glycerol.

3. A formulation according to claim 2 wherein said copolymer thickener is of about 1 weight part of component substantially 1/1 molar ratio methyl vinyl ether/maleic anhydride copolymer having a specific viscosity in the range of 0.1 to 0.5 with about 0.5 weight part of component polyether alcohol consisting essentially of component of $C_{10}$ to $C_{16}$ alcohol with about 16 moles, per mole of said alcohol, of component ethylene oxide.

4. A formulation according to claim 3 in which the total amount of volatile softening agent is less than 60 pounds per 100 gallons.

5. A formulation according to claim 4 comprising a total of 12 to 22 pounds per 100 gallons of a mixture of anionic and nonionic surfactants.

6. A formulation according to claim 5 in which the nonionic surfactant has a hydrophilic/lipophilic balance in the range of 12 to 14.

7. A formulation according to claim 6 in which the total amount of thickener solids is in the range of 0.2 to 10 pounds per 100 gallons.

8. A formulation according to claim 7 in which the pH is in the range of 7.9 to 8.1.

9. A formulation according to claim 8 comprising a salt of methyl methacrylate/ethylacrylate/acrylic acid terpolymer containing about 35 percent combined acrylic acid as auxiliary thickener.

10. A formulation according to claim 9 in which the total non-volatiles is at least 45 percent by weight.

11. A formulation according to claim 10 in which said thickeners are neutralized with ammonium hydroxide.

References Cited

UNITED STATES PATENTS

| | | | |
|---|---|---|---|
| 2,921,930 | 1/1960 | Suhrie | 260—78.5 T |
| 3,002,940 | 10/1961 | Holloway | 260—29.6 TA |
| 3,057,812 | 10/1962 | Straughan et al. | 260—29.6 TA |
| 3,342,787 | 9/1967 | Muskat | 260—78.5 T |
| 3,388,106 | 6/1968 | Muskat | 260—78.5 T |

WILLIAM H. SHORT, Primary Examiner

L. M. PHYNES, Assistant Examiner

U.S. Cl. X.R.

260—29.6 T, 29.7 H, 41 B